United States Patent [19]

Perlman et al.

[11] Patent Number: 5,005,011
[45] Date of Patent: Apr. 2, 1991

[54] VERTICAL FILTERING APPARATUS FOR RASTER SCANNED DISPLAY

[75] Inventors: Stephen G. Perlman, Mountain View; Jerome M. Okun, Campbell; John H. Palevich, Sunnyvale; James A. Lundblad, Santa Clara, all of Calif.

[73] Assignee: Apple Computer, Inc., Cupertino, Calif.

[21] Appl. No.: 290,182

[22] Filed: Dec. 23, 1988

[51] Int. Cl.$^5$ .......................... G09G 5/10; G09G 1/14
[52] U.S. Cl. ...................................... 340/728; 340/793
[58] Field of Search ............... 340/728, 723, 744, 793, 340/747; 364/521

[56] References Cited

U.S. PATENT DOCUMENTS

| | | | |
|---|---|---|---|
| 4,215,414 | 7/1980 | Huelsman | 340/728 |
| 4,322,750 | 3/1982 | Lord et al. | 340/728 |
| 4,354,186 | 10/1982 | Groothuis | 340/728 |
| 4,454,506 | 6/1984 | Netravali et al. | 340/728 |
| 4,808,984 | 2/1989 | Trueblood et al. | 340/728 |

FOREIGN PATENT DOCUMENTS 2640759 3/1978 Fed. Rep. of Germany ...... 340/728

Primary Examiner—Jeffery A. Brier
Attorney, Agent, or Firm—Blakely, Sokoloff, Taylor & Zafman

[57] ABSTRACT

An apparatus and method is disclosed for reducing flicker in an interlaced computer generated raster-scanned display. Several circuits and methods are described for implementing vertical filtering. In general, the data for a given pixel on the nth, nth+1, nth+2 . . . nth+N line is read from memory and convolved to provide data for a given pixel on a display line before pixel data for other pixels along these lines is read from memory.

18 Claims, 12 Drawing Sheets

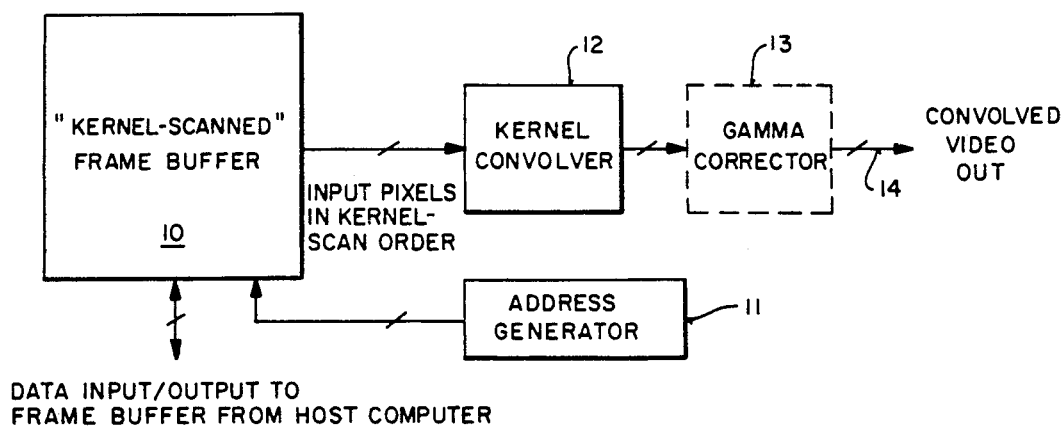
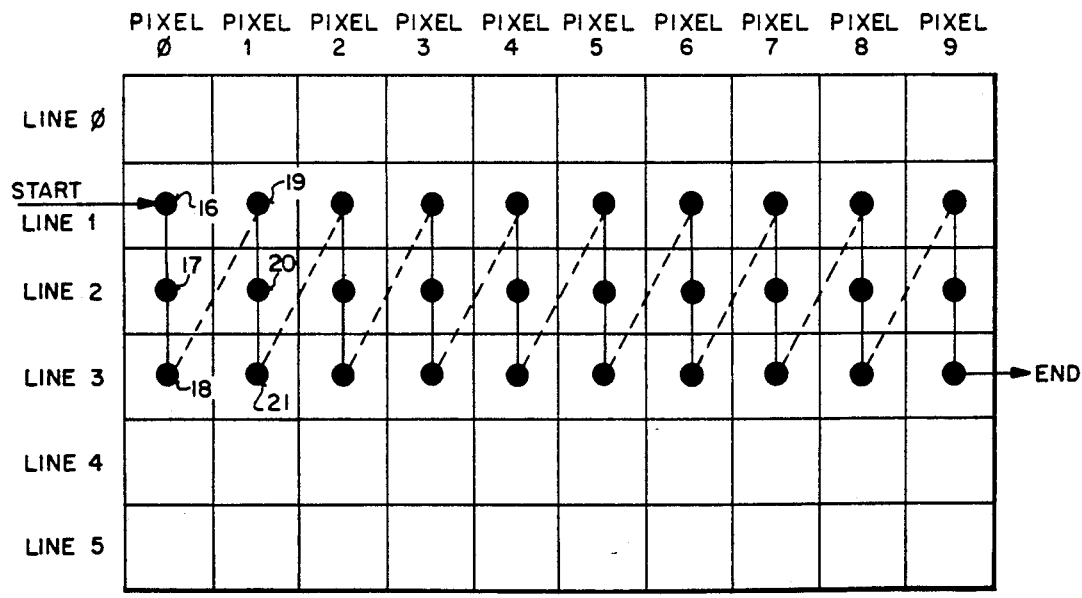

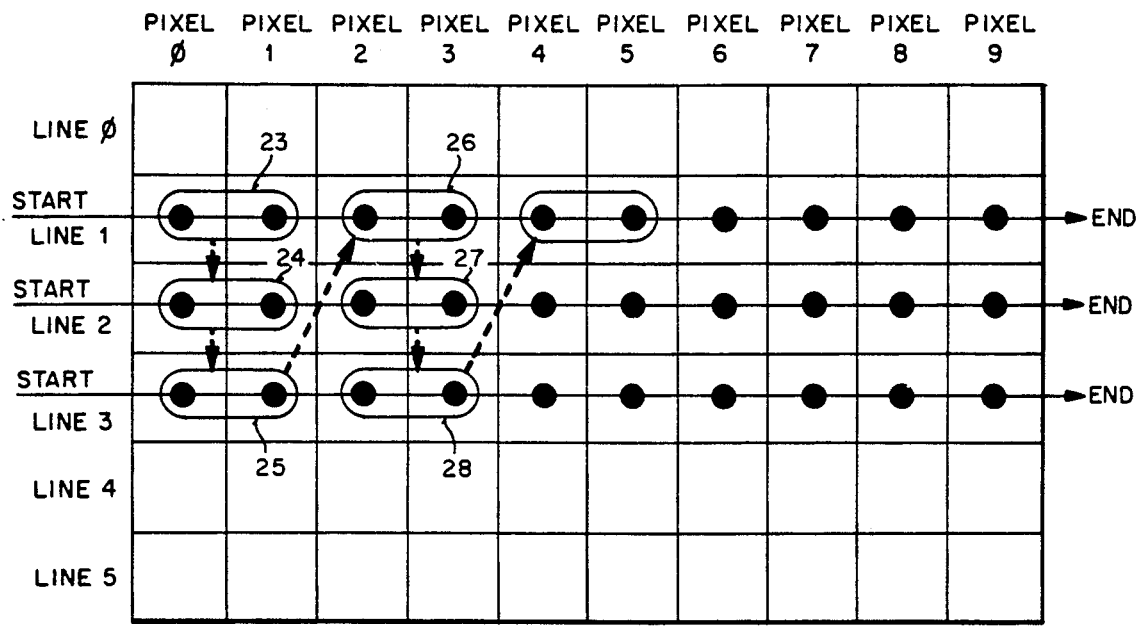
FIG_3
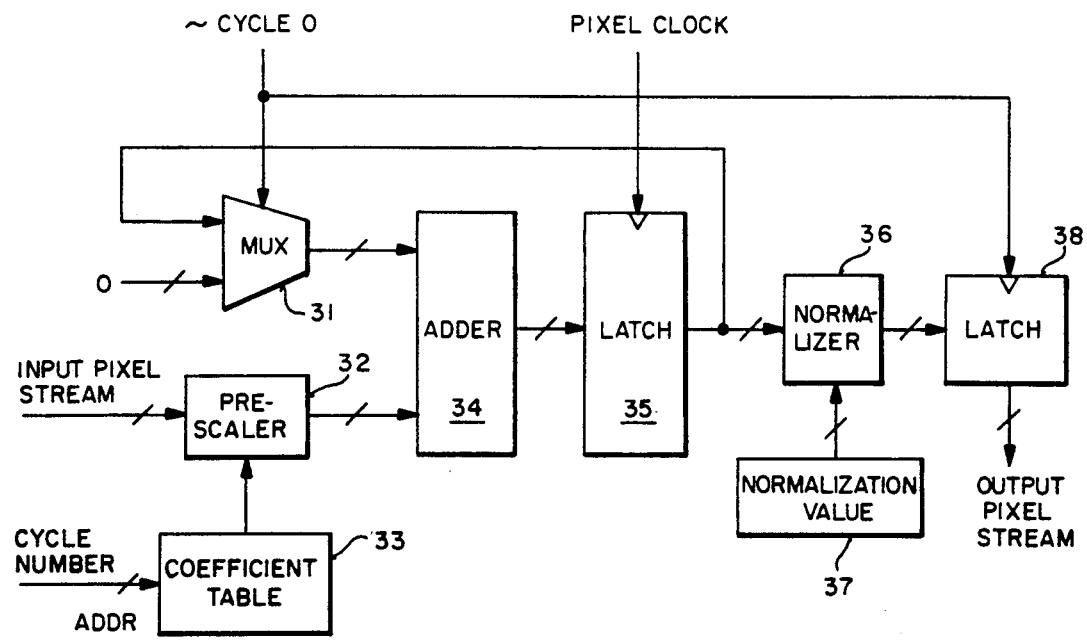
FIG_4

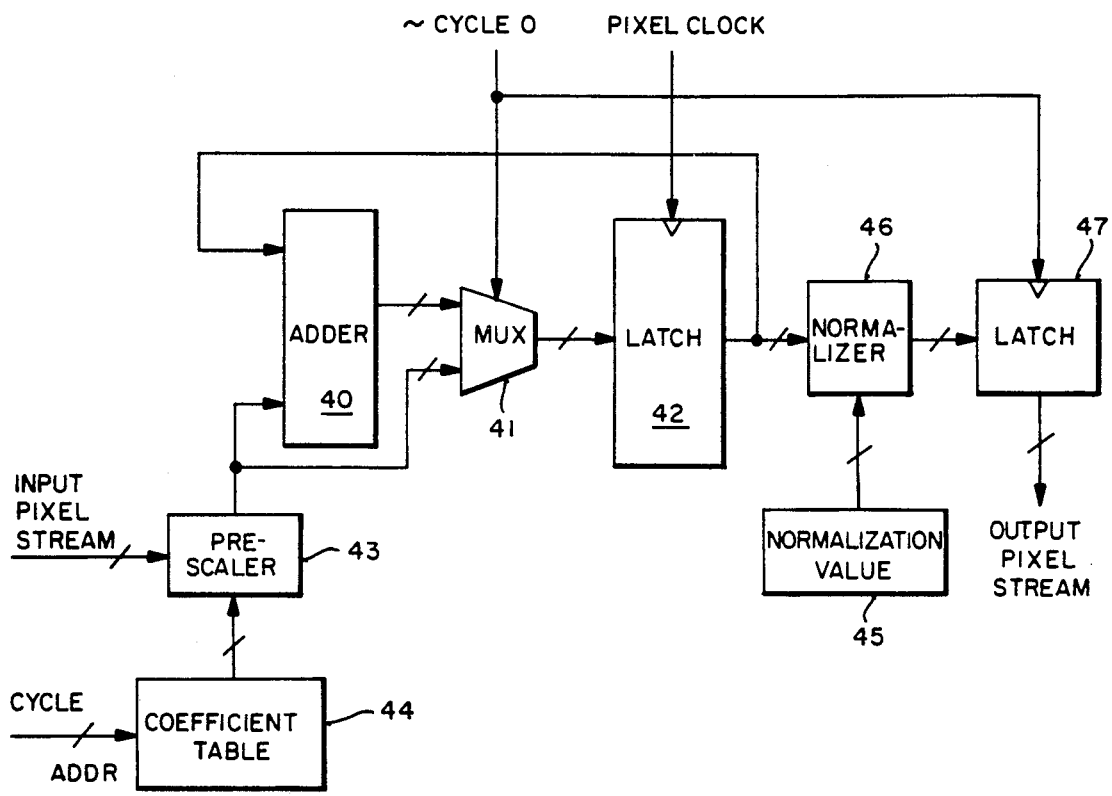
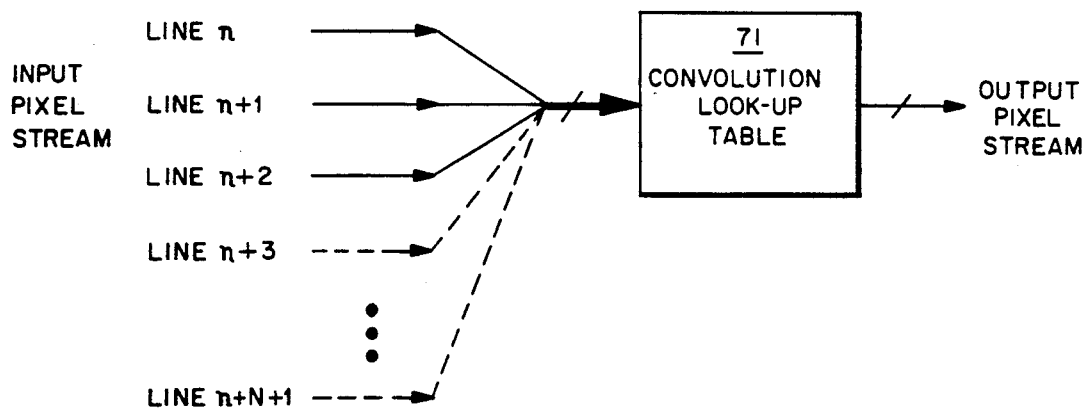

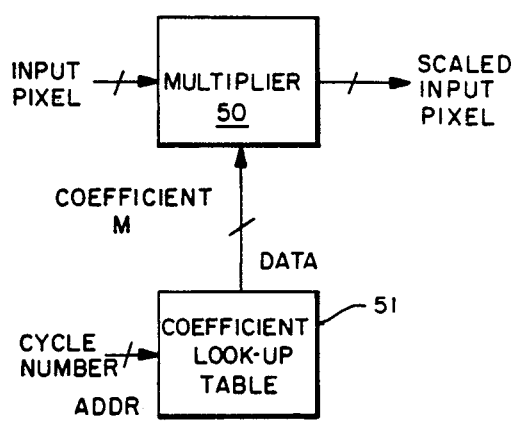
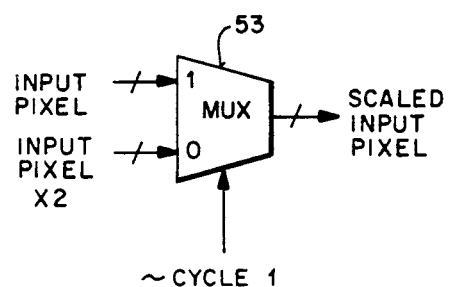
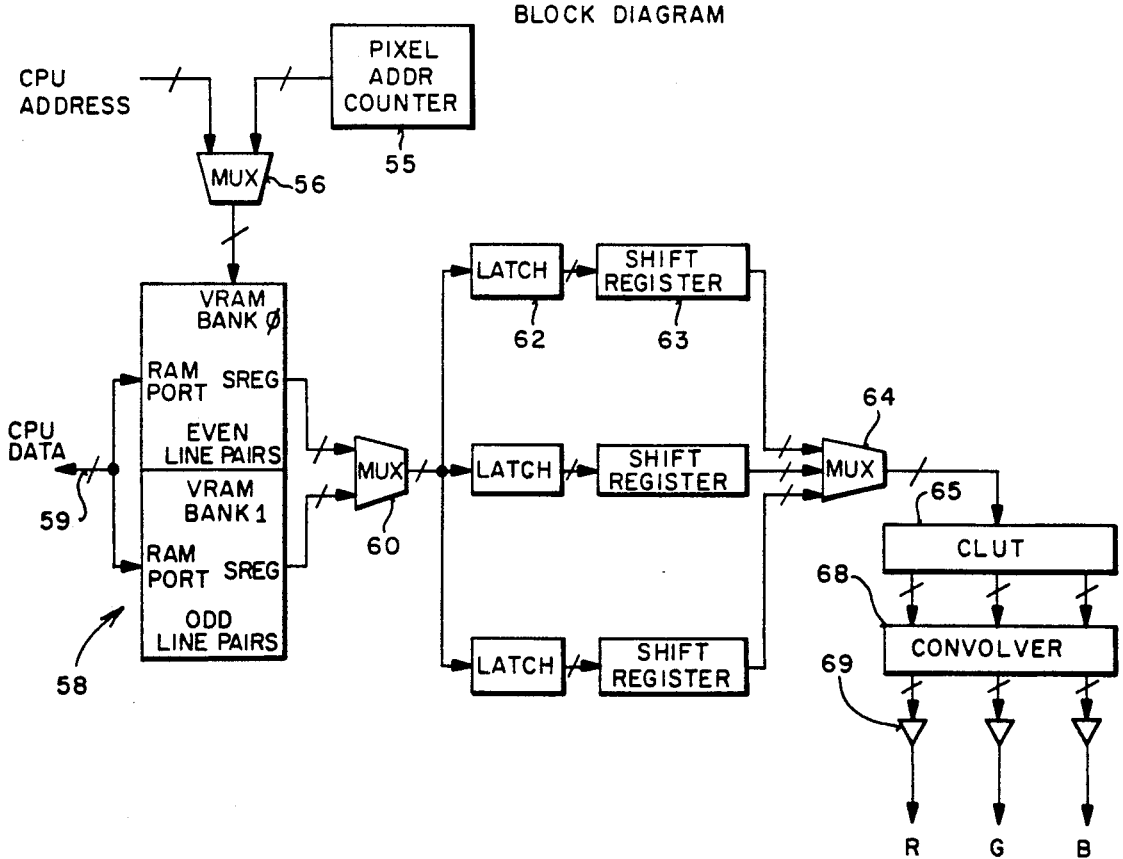

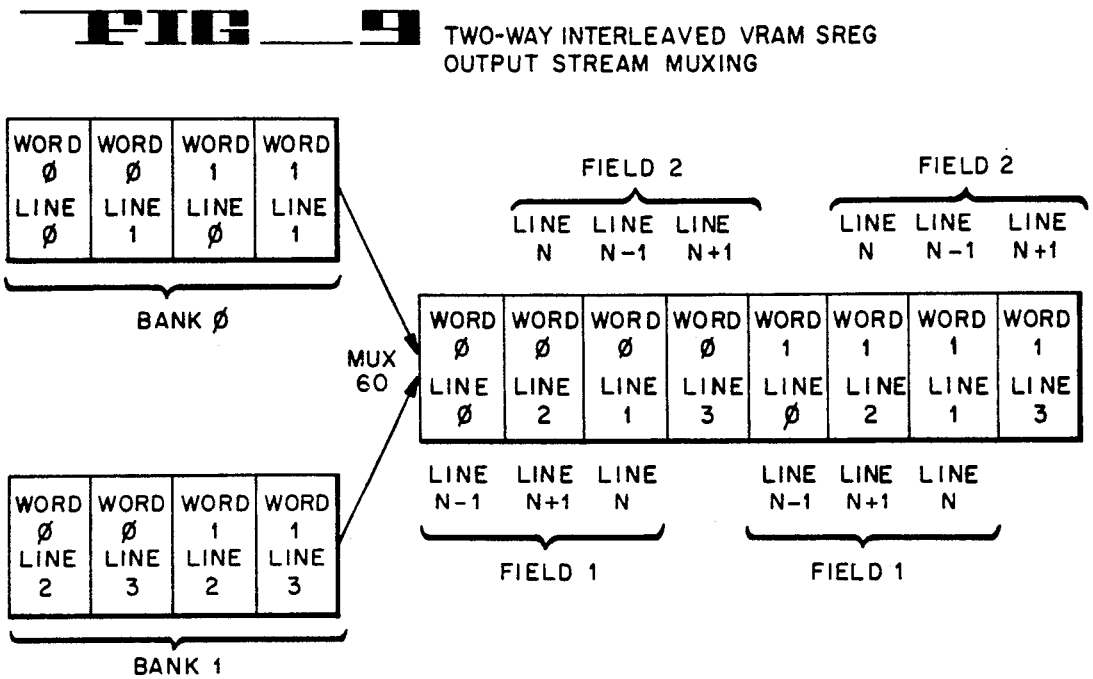
FIG_9 TWO-WAY INTERLEAVED VRAM SREG OUTPUT STREAM MUXING
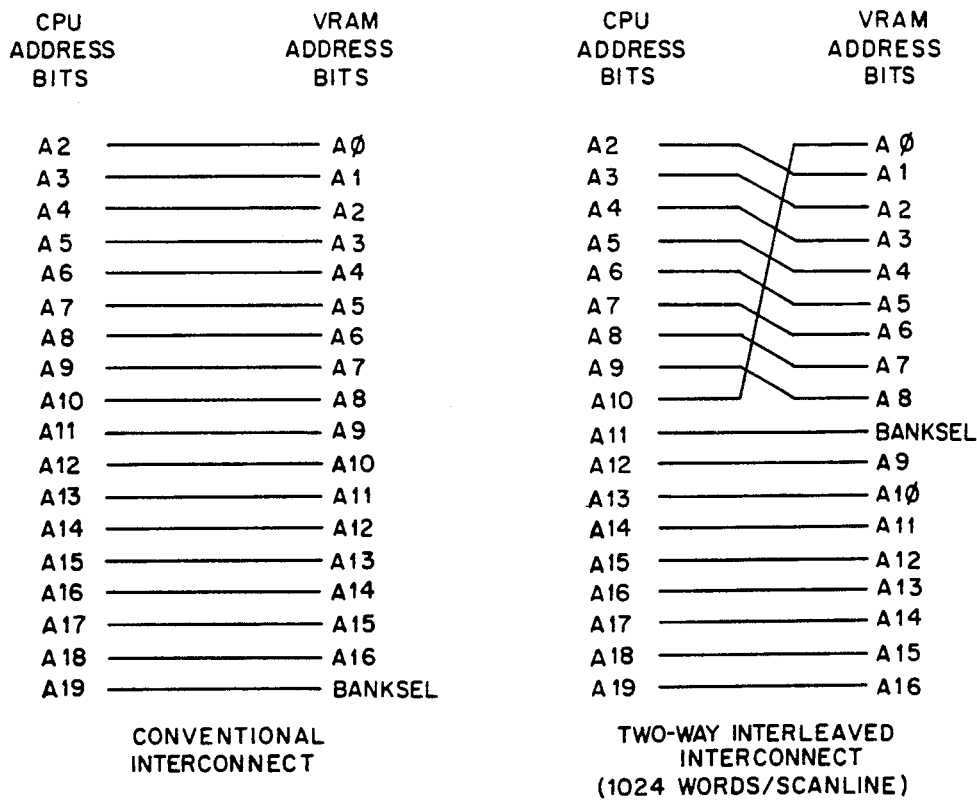
FIG_10 TWO-WAY INTERLEAVED ADDRESS BIT INTERCONNECT

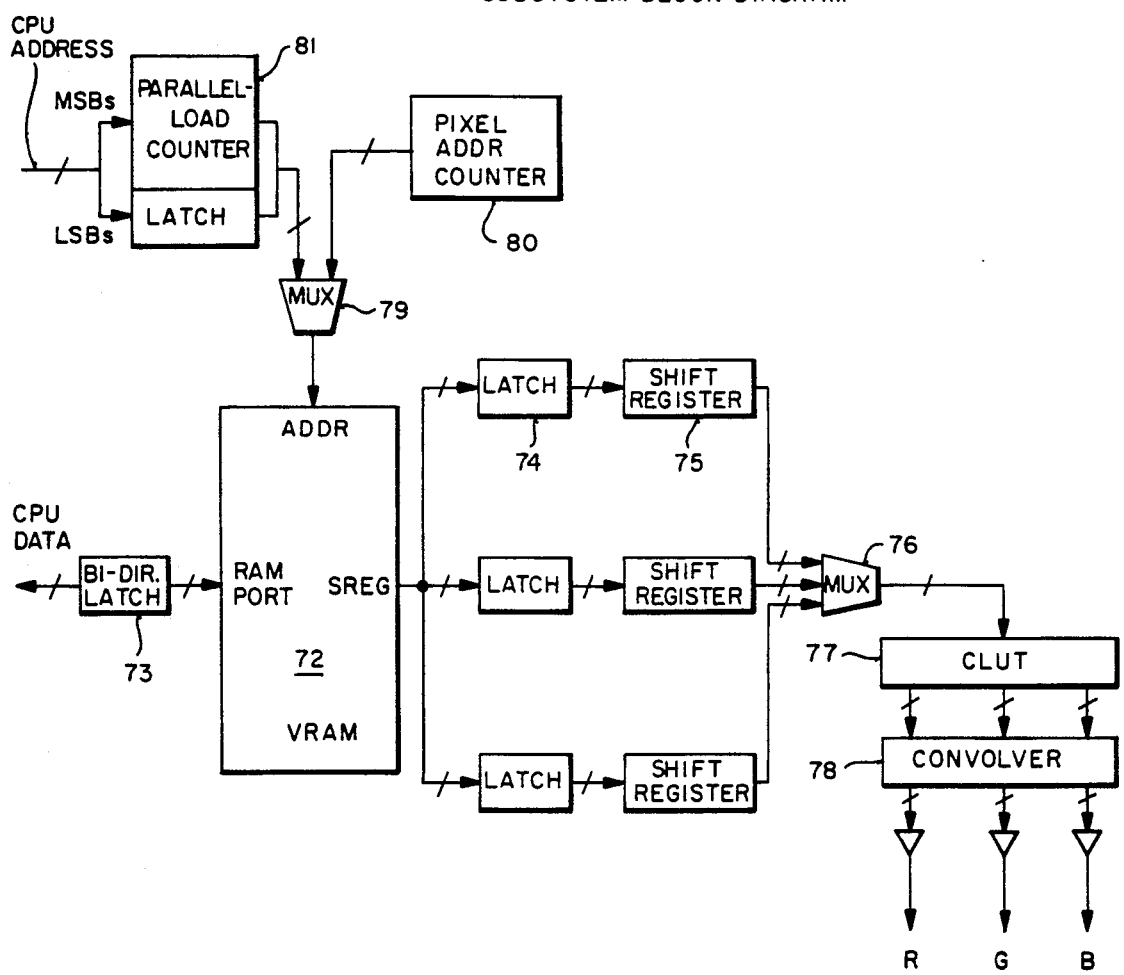
FIG_11 FOUR-WAY INTERLEAVED FRAME BUFFER SUBSYSTEM BLOCK DIAGRAM
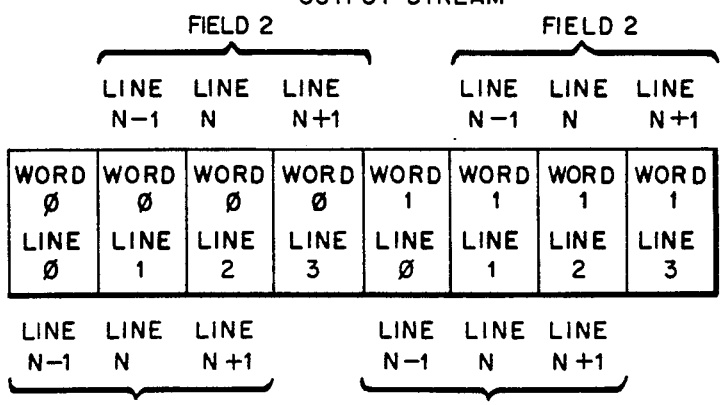
FIG_12 FOUR-WAY INTERLEAVED VRAM SREG OUTPUT STREAM

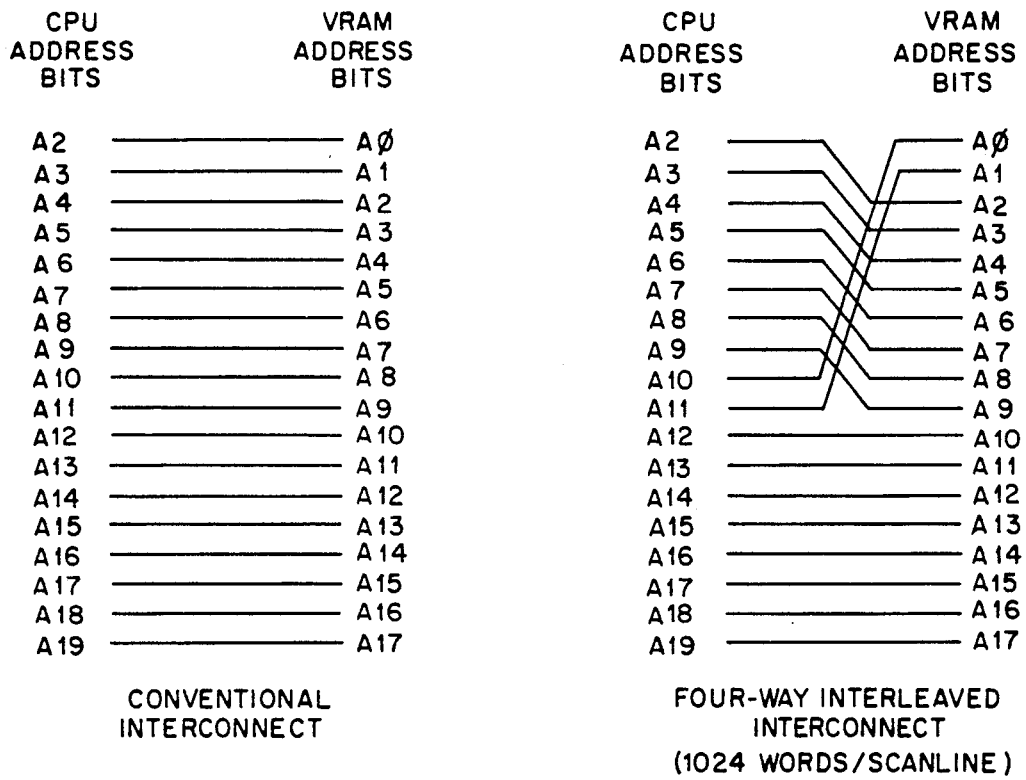
FIG_13 FOUR-WAY INTERLEAVED ADDRESS BIT INTERCONNECT
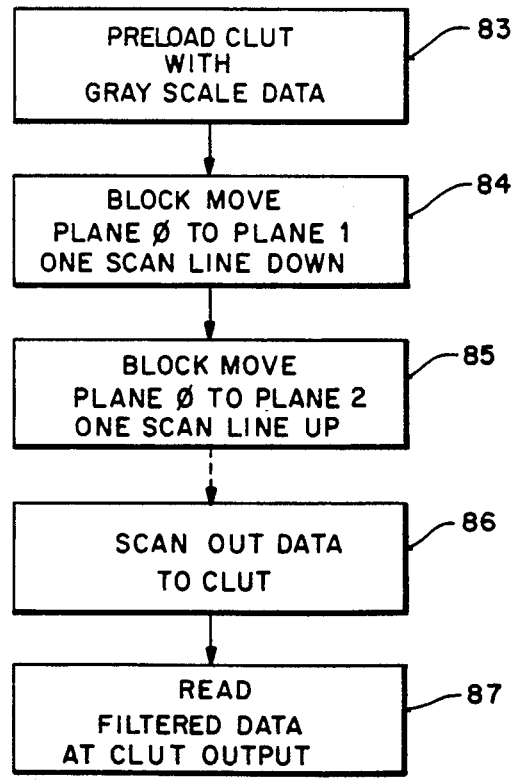
FIG_14

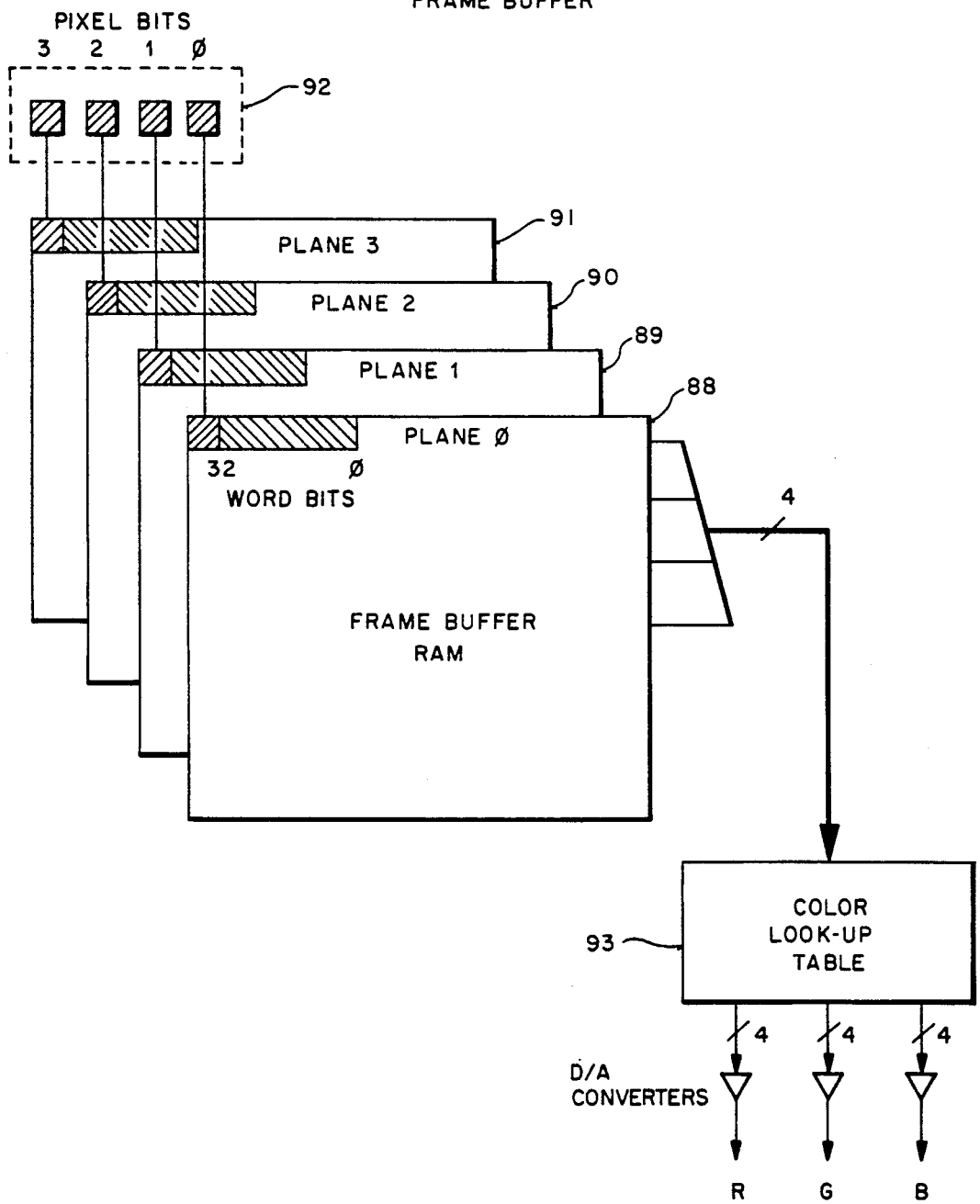

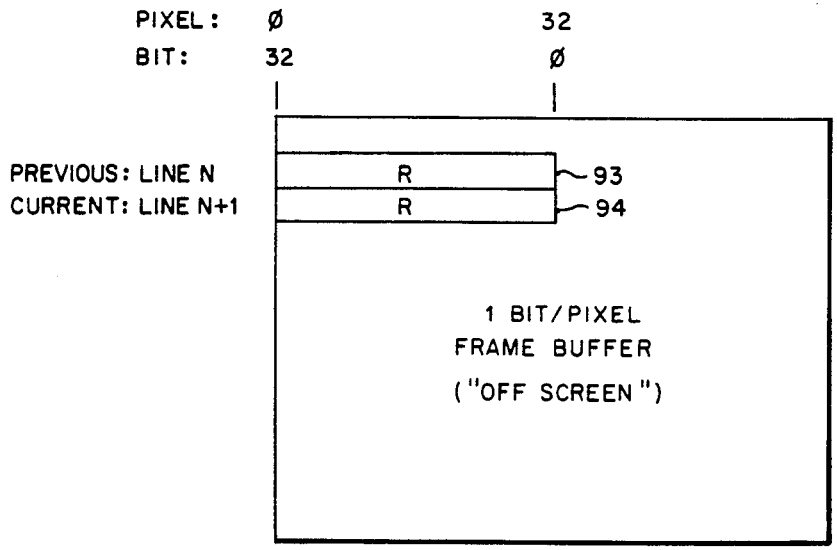
FIG_16 STEP 1: LOAD REGISTER R FROM THE 1 BIT/PIXEL FRAME BUFFER
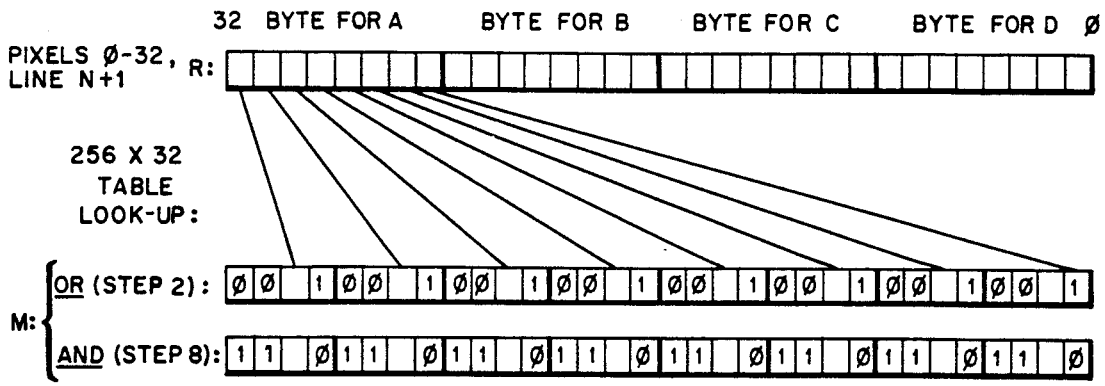
FIG_17 STEP 2: LOAD M WITH TABLE LOOK-UP OF FIRST BYTE OF R

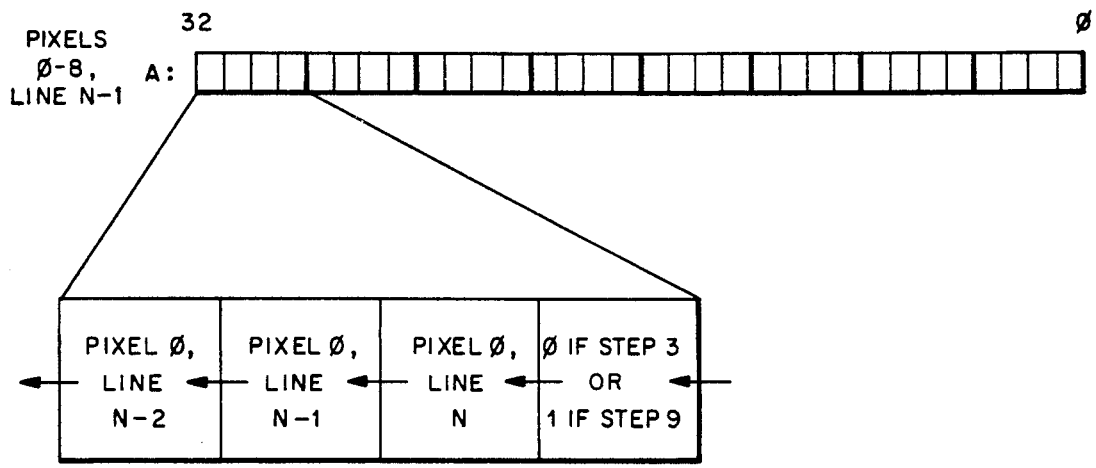
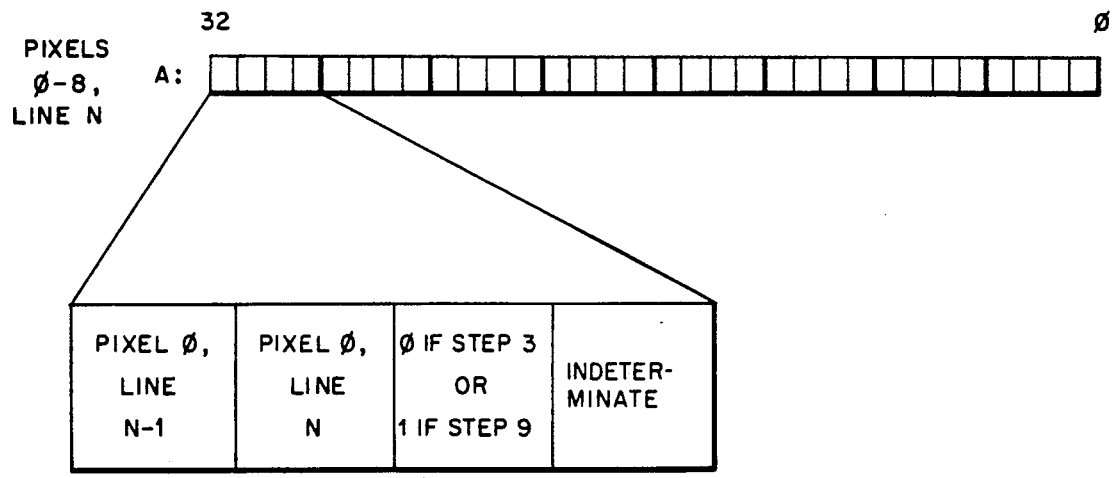
FIG_18 STEP 3: LEFT-SHIFT A BY 1

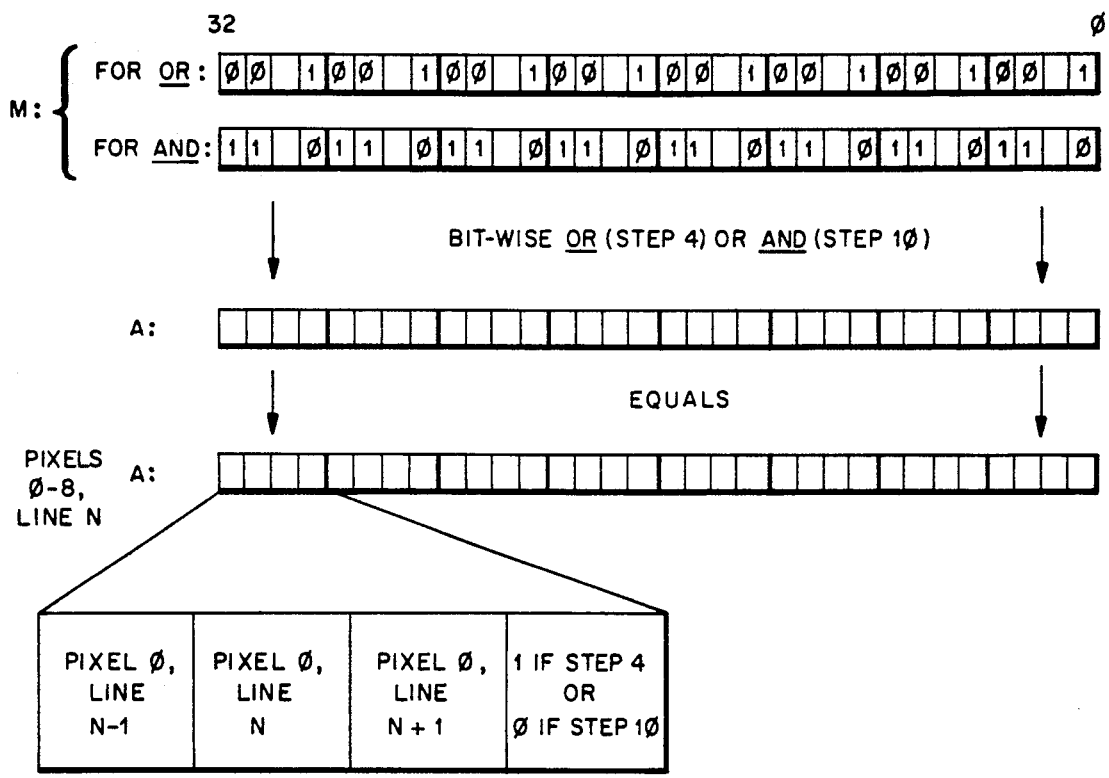
FIG_19 STEP 4: BIT-WISE AND OR OR M WITH A. STORE RESULT IN A
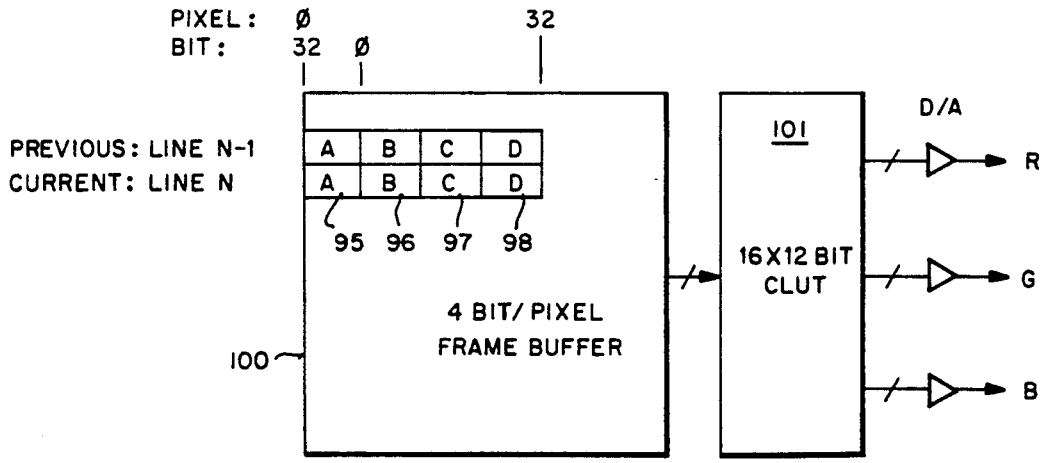
FIG_20 STEP 5

FIG__21  GRAY VALUES LOADED INTO CLUT
(NON-GAMMA CORRECTED)
| | WEIGHT: | 25% | 25% | 50% | |
|---|---|---|---|---|---|
| | LINE: | N+1 | N−1 | N | |
| | PLANE: | 2 | 1 | 0 | CLUT GRAY VALUE |
| CLUT ADDRESS: | | 0 | 0 | 0 | 0% (BLACK) |
| | | 0 | 0 | 1 | 50% |
| | | 0 | 1 | 0 | 25% |
| | | 0 | 1 | 1 | 75% |
| | | 1 | 0 | 0 | 25% |
| | | 1 | 0 | 1 | 75% |
| | | 1 | 1 | 0 | 50% |
| | | 1 | 1 | 1 | 100% (WHITE) |
1-2-1 CONVOLUTION KERNEL
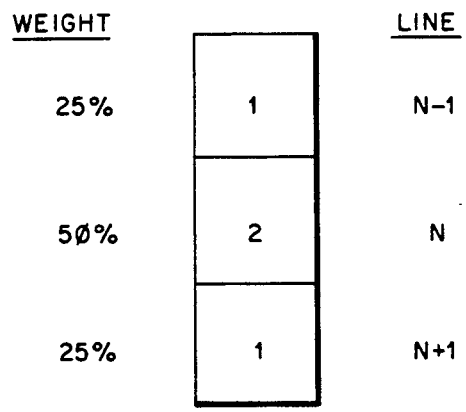
| WEIGHT | | LINE |
|---|---|---|
| 25% | 1 | N−1 |
| 50% | 2 | N |
| 25% | 1 | N+1 |

VERTICAL FILTERING APPARATUS FOR RASTER SCANNED DISPLAY

BACKGROUND OF THE INVENTION

1. Field of the Invention

The invention relates to the field of filtering of video signals for a raster scanned display, particularly one employing computer generated pixel data.

2. Prior Art

Most cathode ray tube (CRT) computer video displays are formed with a raster scan. Many of the standards used with these displays can be traced to television standards. For example, two interlaced fields are frequently used to form a frame. Many early personal computers provided compatible NTSC signals to permit a user to use low cost television receivers. In other instances, computers generate signals such as overlays which are used in conjunction with NTSC signals. Thus, personal computers often generate pixel data for use on interlaced, raster-scanned displays.

Computer generated data has some characteristics which make it less desirable for an interlaced, raster-scanned display than video signals originating in a video camera. For example, pixel data can exhibit changes (e.g., amplitude) over its entire range from pixel-to-pixel. That is, virtually any change in pixel data can occur from one pixel to the next. In contrast, video data from a traditional video camera uses a beam spot which encompasses more than a single pixel area. The data interpreted for a single pixel in this case takes into account to some extent the intensity and color of the surrounding area. Therefore, there is a softening, even a blurring, that occurs as the beam scans the image in a camera.

The human visual system is an edge-detection system. The eyes are very good at finding contours that delineate shapes. To give an example, when displaying a sequence of adjacent gray bars of increasing density on a computer display, the edges between the bars seem emphasized. Perceptually the gray bars do not look like solid colors, but rather they look like they have been shaded between their edges. In other words, the border between the gray bars appear enhanced by the edge-detection mechanisms of the eye.

When a typical real world scene is displayed on an interlaced display, there are no abrupt transitions from one scan line to the next. Objects generally do not have very hard edges, and those that do usually do not have edges lined up with a scan line. The result is the eye cannot find an edge from one scan line to the next. If the eye cannot find an edge between one scan line and the next, it cannot distinguish between lines. In an interlaced display a complete frame is drawn each 1/30th of a second, however, because of the interlacing each 1/60th of a second, either a given scan line or the next scan line is flashed. The eye perceives these multiple scan lines as thick single lines flashing at a 60 frame/second rate even though they are in fact flashing at 30 frames/second. By this model, close viewing of an interlaced display should result in perception of flicker at 30 frames/second. This is in fact what happens; if one is close enough to view individual scan lines on a NTSC television, interlace flicker (i.e., 30 frame/second flashing) is seen, even with a real world image.

In the case of a computer generated image such as a MACINTOSH computer image on a interlace display, virtually every place where there is other than solid white or solid black there are abrupt transitions in the vertical dimension. (Macintosh is a registered trademark of Apple Computer, Inc.) In the case of the "racing stripes" (alternately black and white horizontal lines) on the top of a typical Macintosh window, there is the most abrupt transition possible, black to white, stretched across the length of the window and repeated for several lines. Here, it is easy for the human eye to detect the edge from one scan line to the next, so it considers the scan lines as individuals, flashing at 30 frames/second. The visual perception of the human observer is that where there are abrupt transitions on the display, the NTSC image flickers noticeably enough to be distracting.

One additional subtlety is worth mentioning. The human eye will see flicker display wherever there are transitions (i.e., edges) in the vertical dimension. But, the degree of flicker is not uniform for each type of graphic pattern. The worst pattern is the racing stripes across the top of a window, mentioned above. Text and other random patterns flicker as well, but not nearly as severely. This is accounted for by the fact that it is easier to discern vertical edges where there is a high horizontal correlation to the pattern (as in the case of the racing stripes), but harder to find the edges when there is a low horizontal correlation (as in the case of text). (As will be seen, since the present invention provides adaptive filtering for the subtlety.)

Numerous prior art techniques are known including those employing anti-aliasing filters for removing this flicker. In some cases, filters duplicate the softening effects of the camera beam, that is, pixel data for a cluster or spot of pixels is "averaged" or "convolved" to produce filtered pixel data. In general, these techniques require considerable computational overhead.

As will be seen, the present invention provides filtered pixel data, however, only in the vertical direction. The convolving performed by the present invention to provide the filtered pixel data is done "on the fly" since the computational demands are substantially less than that required by prior art systems.

SUMMARY OF THE INVENTION

An improved method for generating vertically filtered pixel data in a raster-scanned video display is described. The video data is stored in a frame buffer which is organized by scan lines with data being stored for each pixel along each scan line. To generate the filtered pixel data for a first pixel of a first line, pixel data is read from the buffer for the first pixel of the nth, n+1, n+2...n+N scan lines. This is done before pixel data for other pixels along these scan lines is read from the frame buffer. This avoids the need for a plurality of line buffers or even additional frame buffers if all the data was read for each of the scan lines. The pixel data for the first pixel of the nth, n+1, n+2...n+N scan lines is convolved to provide the pixel data for the first pixel of the first scan line.

In one currently preferred "hardware" embodiment, where N=2, the pixel data is stored in two banks of video RAMs (VRAMs) with the video data for scan lines 0, 1, 4, 5, 8, 9... stored in one bank and the video data for scan lines 2, 3, 6, 7, 10, 11... stored in the other bank. Then the data for pixel 0 of scan lines 0, 1, 2, and 3 is read from the VRAMs. The data for pixel 0 of lines 0, 1, and 2 is convolved. The data for pixel 0 of line 3 is ignored. The process is repeated for pixel 1, and so on to complete the line.

In this embodiment, the convolving step consists of a relatively simple weighting with half the weight being given to the pixel data of the n and n+2 scan lines when compared to the weight given to the pixel data of the n+1 scan line.

Other details of the present invention will be apparent from the following detailed description, including "software" embodiments.

BRIEF DESCRIPTION OF THE DRAWINGS

FIG. 1 is a general block diagram illustrating the general placement of the present invention in a video system.

FIG. 2 is a diagram used to illustrate a method used by the present invention to read data from a frame buffer.

FIG. 3 is a diagram used to illustrate an alternate method used by the present invention to read data from a frame buffer.

FIG. 4 is a block diagram illustrating an embodiment of a convolver used in the present invention.

FIG. 5 is a block diagram illustrating another embodiment of a convolver used in the present invention.

FIG. 6 is a block diagram illustrating another method for obtaining convolved data particularly useful where not many bits are stored for each pixel.

FIG. 7A is a block diagram of a general prescaler which can be used with the convolver of the present invention.

FIG. 7B is a block diagram of another prescaler which can be used with the convolver of the present invention.

FIG. 8 is a block diagram of a circuit illustrating one presently preferred hardware embodiment of the invention employing two-way interleaving.

FIG. 9 is a diagram illustrating pixel data flow used to describe the operation of the circuit of FIG. 8.

FIG. 10 is a diagram illustrating the relationship between CPU and VRAM addresses for the two-way interleaved frame buffer of FIG. 8.

FIG. 11 is a block diagram of a circuit illustrating another hardware embodiment of the present invention, this one employing four-way interleaving.

FIG. 12 is a diagram illustrating pixel data flow used to describe the operation of the circuit of FIG. 11.

FIG. 13 is a diagram illustrating the relationship between CPU and VRAM addresses for the four-way interleaved frame buffer of FIG. 10.

FIG. 14 is a flow diagram illustrating an embodiment of the present invention implemented in a software program; this embodiment is for a planar frame buffer.

FIG. 15 illustrates in more graphic form a planar frame buffer.

FIG. 16 illustrates a first step in implementing the present invention in software for a "chunky" frame buffer.

FIG. 17 illustrates a second step in the implementation described in conjunction with FIG. 16.

FIG. 18 illustrates a third step in the implementation described in conjunction with FIGS. 16 and 17.

FIG. 19 illustrates a fourth step in the implementation described in conjunction with FIGS. 16-18.

FIG. 20 illustrates a fifth step in the implementation described in conjunction with FIGS. 16-19.

FIG. 21 illustrates gray values loaded into the color lookup table.

DETAILED DESCRIPTION OF THE PRESENT INVENTION

A method and apparatus for providing filtering data, in a raster-scanned video apparatus is described. The invention provides filtering in the vertical direction (perpendicular to the direction of the scan lines). In the following description numerous specific details are set forth in order to provide a better understanding of the present invention. It will be obvious, however, to one skilled in the art that the present invention may be practiced without these details. In other instances, well-known circuits and computer operations have been shown in block diagram form, in order not to obscure the present invention in unnecessary detail.

OVERVIEW OF THE PRESENT INVENTION

Referring first to FIG. 1 a frame buffer 10 is illustrated which in the presently preferred embodiment may be an ordinary frame buffer, for example, one fabricated from dynamic random-access memories (DRAMs) or video random-access memories (VRAMs). Most often, data is organized in the frame buffer by scan lines with data being stored for each pixel along each scan line. In some cases, the pixel data is organized in planes such that the pixel data for a given pixel is stored with each bit on a different one of the planes (i.e., planar frame buffer of FIG. 15). When data is organized in this arrangement, a scanning address causes a bit from each plane to be read from the memory, the bits are assembled to form a pixel, and hence, the data for a given pixel is read from the memory for a video display. (Often when writing data to a memory organized by planes, an 8 or 16 bit word is written to each plane; this is particularly useful for a black and white, or two-color display, where only a single bit is stored per pixel and hence data is written into only a single plane.) For some embodiments of the present invention, the data is stored in an ordinary manner as described above. In other embodiments, the data is two-way interleaved between two banks of memory as will be described in conjunction with FIG. 8. Even with this arrangement, however, the data is still stored by scan lines.

An address generator 11 is used to address the data in the buffer to provide an output signal for a video display. As will be seen with the present invention the order in which the data is scanned from the buffer is different than that used in the prior art and hence, the address generator 11 provides this unique addressing order. (This is referred to as "kernel-scanned" in FIG. 1.) The specific order employed will become apparent, particularly from the discussion below for FIGS. 2 and 3. Ordinary circuits may be used to implement the generator 11 and provide the order described in FIGS. 2 and 3. As in the case with prior art generators, the address generator 11 is generally synchronized with a dot clock.

The output from the buffer 10 is convolved by convolver 12. The output of the convolver 12 is pixel data which can be used in an ordinary manner for a video display. The convolver 12 is described in conjunction with FIGS. 4 and 5 and portions of it are described in conjunction with FIGS. 7A and 7B.

In the currently preferred embodiment the output of the convolver 12 is gamma corrected. Such gamma correction is well-known in the art and used to compensate for the non-linear light intensity curve of CRT displays. The digital information on line 14 is converted to an analog form for coupling to a display.

In the following description it is assumed that the buffer 10 stores pixel data. It will be appreciated that the buffer may store pointers to another memory such as a color lookup table. In this event, the output of the buffer 10 is coupled to a color lookup table and the output of the color lookup table is coupled to the convolver 12.

In FIG. 2 it is assumed that each of the blocks in the illustrated grid represents a pixel in a bit mapped buffer. In the horizontal direction the pixels are numbered from 0 through 9; it will be appreciated that in a typical memory, many more pixels are used in the display. In the vertical direction the rows of pixel data are numbered by scan line beginning with line 0, and ending at line 5. Again, it will be appreciated that in a typical display many more scan lines are used. FIG. 2 thus represents the data organization that is found in a typical frame buffer.

For the present invention the data for a given pixel (e.g., pixel 0) is read from the memory for several lines (e.g., lines 1, 2 and 3) before the pixel data for pixel 1 is read from the memory. The pixel data for the several lines of a given pixel is convolved to provide the pixel data used by the display.

More specifically, in FIG. 2 the data at locations 16, 17 and 18 is read from the memory before the data for pixel 19 is read from the memory. The pixel data from locations 16, 17 and 18 is then convolved to provide pixel data for pixel 0 of a display line. Next, the pixel data at locations 19, 20 and 21 is read from the memory and convolved to provide pixel data for pixel 1 of the display line. This process continues for each of the pixels 0 through 9 for scan lines 1-3 to provide pixel data for a given display line.

For the illustrated embodiment three lines of data are used in the convolution process. Any number of lines may in fact be used, for example, the data from lines n, n+1, n+2... N+n may be first used to provide pixel data for a first display line. Following this, the data from lines n+1, n+2, n+3... n+N+1 is used to provide the pixel data for a second display line. However, the data is used from the buffer such that all the pixel data for, for instance, pixel M is read for all the scan lines being used in the convolution before the pixel data for pixel M+1 is read from the buffer.

In some cases, the addressing and mapping scheme used for a frame buffer provides more than the data for a single pixel for each address. As illustrated in FIG. 3 assume that a single address provides the pixel data for pixel 0 and pixel 1 of line 1, this is shown by the enclosing line 23. With the present invention, the data associated with line 23 is first read from the memory, followed by the convolution of data associated with lines 24 and 25. Then convolution is performed on the data for pixel 0 of lines 1, 2 and 3 for pixel 0, followed by the data for pixel 1, for lines 1, 2, 3. Now the data associated with lines 26, 27 and 28 is read from the memory, and so on.

In a specially organized frame buffer such as that described in a presently preferred embodiment, a single address provides the data for several lines in the buffer. For example, a single address may provide the data associated with lines 23, 24 and 25. In this event, the first data for pixel 0 is convolved, then that of pixel 1 is convolved. After that the data associated with lines 26, 27 and 28 is read from the memory and the data for pixel 2, and then 3 is convolved. This process continues for all the data along the line for scan lines 1, 2 and 3.

Thus, in general, the data for a first pixel for scan lines n, n+1, n+2... n+N is read from the buffer before the pixel data for subsequent pixels on these scan lines is read from the buffer. This data is then convolved to provide pixel data for a single pixel. This process is repeated for each of the pixels along the scan lines n, n+1, n+2... n+N. Following this the data for a first pixel along lines n+1, n+2... n+N+1 is read from the buffer, again before the pixel data for subsequent pixels along these lines. This data is then convolved to provide the filtered pixel data for the first pixel of the next display line. This process is repeated until vertical filtered data is provided for the entire display.

EMBODIMENTS OF THE CONVOLVER

As mentioned above, the pixel data from "N+1" lines of data may be convolved. In the currently preferred embodiment N=2. (There is a discussion of convolution for other kernels later in this application.) In this case, N implements the equation $$\frac{aP_1 + bP_2 + aP_3}{2a + b}$$

where $P_1$ is the pixel data for the first pixel of the nth scan line, P2 the pixel data for the first pixel of the nth+1 line, and pixel 3 the pixel data for the n+2 scan line. "a" and "b" are constants with "b" usually being greater than "a". In a typical application a=1 and b=2.

In FIG. 4, the convolver (corresponding to kernel convolver 12 in FIG. 1) includes a prescaler 32 which receives the input pixel data from the buffer. The amount of prescaling performed by prescaler 32 is controlled by the output of the coefficient table 33. The output of table 33 is controlled by the current cycle number which will be discussed. The output of the prescaler 32 provides one input to an adder 34. The other input to the adder 34, in effect, is the output of the adder 34 after being coupled through the latch 35 and the multiplexer 31. The multiplexer 31 either provides as an input to the adder 34 the output of the latch 35 or the value 0. As will be seen at "cycle 0", the 0 input is provided to the adder 34, otherwise the contents of the latch 35 is the input to the adder 34. The contents of the latch 35 is normalized by a normalizer 36, the amount of normalization, typically a constant, is shown as normalization value 37. The output of the normalizer 36 is latched by latch 38, and the contents of this latch provide the pixel data for a pixel along a display line.

In practice, the prescaler is simply a digital shifter that provides digital multiplication by a factor of 1 or 2 and the normalizer 36 is another digital shifter which performs division by shifting the digital data by, for example, 2 places for division by four.

Assume first that a=1 and b=2 in the equation discussed above. Further assume that data is being scanned from a buffer in the manner illustrated and described in conjunction with FIG. 2. The convolver can be seen to operate in a 3 clock cycle sequence. During a cycle 0 the data associated with circle 16 is coupled to the prescaler 32. Cycle number 0 when applied to the coefficient table 33 causes the prescaler 32 to multiply this data by one, hence, the data is directly coupled to the adder 34. The cycle 0 coupled to the multiplexer 31 selects the zero input to the adder; therefore, 0 is added to the data associated with circle 16. This data is simply latched within latch 35 under control of the pixel clock. Next the data associated with circle 17 is coupled to the prescaler 32 on cycle 1. The cycle 1 input to the table 33 causes the prescaler to multiply this data by 2 (a left-shift of one) before coupling it to the adder 34. At the same time the output of the latch 35 is coupled through the multiplexer 31 and is added to the output of the prescaler 32. Hence, the sum $P_1+2P_2$ is formed and coupled to the latch 35. Following this on cycle 2 the data associated with circle 18 is coupled to the prescaler 32. The cycle number "2" coupled to table 33 causes this data to be directly coupled to the adder 34. The adder 34 adds this data to the data contained within latch 35 forming the sum $P_1+2P_2+P_3$. This sum is latched within latch 35 and then normalized by normalizer 34. For the described embodiment, normalizer 36 divides the data by a factor of 4 (a right-shift by 2) forming the final equation $$\frac{P_1 + 2P_2 + P_3}{4}$$

The resultant pixel data is latched in latch 38. On cycle 0 this data may be read from the latch 38 while new data for the next pixel is being coupled to the prescaler 32.

A fourth cycle may be used (i.e., cycle 3), in which event cycle 3 can control latch 38 with no data being shifted into the prescaler 32 during cycle 3. This can be used if 3 cycle timing is inconvenient.

An alternate convolver is illustrated in FIG. 5. In this embodiment, an adder 40 receives as a first input, the output of the prescaler 43. Once again, the prescaler 43 receives the pixel data from the buffer. The amount of prescaling of prescaler 43 is controlled by the coefficient table 44. The output of table 44 is controlled by the cycle number coupled to the table. The other input terminal of the adder 40 receives the output of the latch 42. The input to the latch is the output of the multiplexer 41. Multiplexer 41 selects either the output of the prescaler 43 or the output of the adder 40. The multiplexer 41 is controlled by the cycle 0 signal; for cycle 0 multiplexer 41 selects the output of the prescaler 43, otherwise it selects the output of the adder. The output of the latch 42 is coupled to a normalizer 46. The amount of normalization is controlled by the values shown as "normalization value 45". The output of the normalizer 45 is coupled to a latch 47. The output of the latch 47 provides the filtered pixel data.

The circuit of FIG. 5 performs the same convolution as the circuit of FIG. 4.

Assume that the data for line n for pixel 0 is coupled to the prescaler 43. During the cycle 0 the multiplexer 41 selects the output of the prescaler 43 and couples the data into the latch 42. The prescaler 43 does not scale the data, because a=1 in the equation discussed above. The data for pixel 0 of line n+1 is prescaled by 2 and this data is then added to the contents of the latch with the sum being coupled to the multiplexer 41 and latched in latch 42. The process continues until the sum $aP_1+2P_2+aP_3$ is formed, computed and stored in latch 42. The normalizer 46 divides this sum by a factor of 4 and the resultant normalized value is coupled into the latch 47. Again, on cycle 0 (the start of new data into the prescaler 43 for the next pixel) the data is clocked from the latch thereby providing the filtered pixel data for the display. Once again, a four cycle scheme may be used with the fourth cycle (cycle 3) controlling latch 47.

In FIG. 7A a general prescaler is shown comprising a multiplier 50. The input pixel data is coupled to the multiplier, the output of the multiplier provides the scaled pixel data. The amount of multiplication is controlled by the output of the coefficient lookup table 51. This output is determined by the cycle number. The cycle number (e.g., 1,2,3. . . ) selects the amount of multiplication required for the convolution being used and thereby controls the amount of multiplication performed by the multiplier 50.

FIG. 7B illustrates a prescaler which may be used when the multiplication used by the convolution step involves multiplication by one or by two. In this case a multiplexer 53 receives the input pixel data at one terminal and the input pixel data multiplied by two (i.e., left-shifted by 1 with a zero filling in on the right) at its other terminal. The cycle number requiring the "$\times 2$" pixel data is used to select the "0" input to the multiplexer 53 and thus provides the needed scaled input pixel data.

The convolvers discussed above are particularly good for a serial kernel data stream. FIG. 6 illustrates a convolver implemented in a table 71 which can be used for a parallel data stream. It is particularly useful when a limited number of bits are used; for example, in a 1 bit/pixel display where the 1-2-1 kernel is used. The results of the convolution arithmetic are precomputed and placed in the table. This is used as will be seen for software embodiments of the invention where the color lookup table is preloaded for use as a convolution lookup table.

A CURRENTLY PREFERRED EMBODIMENT OF THE INVENTION

In one currently preferred embodiment of the invention, the pixel data is stored in two banks of VRAM memory which together comprise a frame buffer. This is illustrated in FIG. 8 by the bank 0 and bank 1 of memory 58. The addresses for the banks of memory are provided either from the CPU or from a pixel address counter 55. One of these addresses is selected by the multiplexer 56. Data to and from the CPU is coupled to the RAM ports of the memory through the bus 59. The shift register outputs of either bank 0 or 1 is selected by the multiplexer 60. (This multiplexer can be eliminated if the 3-state feature of the VRAM shift register switches quickly enough.)

The parallel lines from the multiplexer 60 are coupled to three latches such as latch 60, and then in parallel to three shift registers such as shift register 63. The multiplexer 64 selects data from one of the three shift registers and couples it to the color lookup table (CLUT) 65. The output of the CLUT is coupled to a convolver such as convolver 68 which may be constructed as described above. The digital outputs from the convolver are converted by digital-to-analog converters such as converter 69 to provide RGB signals for a color monitor. Normally, a gamma correction device is placed after the convolver 68 in digital or after the converters 69 in analog.

As indicated in FIG. 8, bank 0 is used to store even line pairs of pixel data and bank 1 is used to store odd line pairs of pixel data. Note this refers to "line pairs", not lines themselves. More specifically, the "even line pairs" refers to lines 0 and 1, 4 and 5, 8 and 9, etc. The odd line pairs refers to the lines 2 and 3, 6 and 7, etc. The output streams from the two banks of memory (with two-way interleaving) are multiplexed together to form a single word stream as shown in FIG. 9. This provides groups of 4 words, one word for each group which is not used. The other three words are convolved as described above.

An output from bank 0 specifically word 0/line 0, word 0/line 1, word 1/line 0, and word 1/line 1 is shown in FIG. 9. A corresponding output from bank 1 is also shown, specifically word 0/line 2, word 0/line 3, word 1/line 2; and word 1/line 3. After multiplexing they provide a single word stream, specifically word 0/line 0, word 0/line 2, word 0/line 1, word 0/line 3, word 1/line 0, word 1/line 2, word 1/line 1 and word 1/line 3. Then, as indicated through convolving, word 0/line 0, word 0/line 2 and word 0/line 1 are used to provide data for the pixel or pixels (depending on how many pixels are stored for each word) for line 1 in interlaced field 1. Similarly, word 1/line 0, word 1/line 2 and word 1/line 1 provide data for the subsequent pixel or pixels on that line. At this time, word 0/line 3 and word 2/line 3 are ignored. On another pass through the memory data for pixels for line 2 in interlaced field 2 is used; this time word 0/line 0, and word 1/line 0 are ignored.

From the viewpoint of the CPU, the VRAM is made to appear as a contiguous block. This causes the interleaving to be transparent to the CPU. The interconnections which provide this transparence are discussed below.

In the lefthand column of FIG. 10, conventional coupling of the addresses between the CPU and a VRAM is shown. In effect, there is a 1-to-1 connection between the CPU address lines and the VRAM address lines. The example of FIG. 10 assumes a 32-bit word size. The CPU address bits A0 and A1 are thus used to enable VRAM bytes and words, rather than specific VRAM address bits. For that reason, the CPU address bit A2 is coupled to the VRAM address bit A0, CPU address bit A3 to VRAM address bit A1, etc. Also, since there are 2 banks of VRAM, one address line must be designated as a bank select signal. With a conventional coupling any address bit may be used for the convenience of the design. CPU address A19 is shown coupled to BANKSEL in the example.

The connections between the CPU address bits and the VRAM address bits for the two-way interleaving is shown in the second column of FIG. 10. The example assumes that there are 1,024 bytes per scan line. If this is the case, the address bit A10 from the CPU is the bit which selects between odd and even scan lines. This bit is coupled to A0 of the VRAM. The effect of this bit manipulation is that instead of selecting between odd and even scan lines, the address bit selects between odd and even words, thereby interleaving two lines together by word. Also, A11 is coupled to BANKSEL to select between VRAM banks 0 and 1 every other scan line. It is this bit manipulation which makes the two-way interleaving appear transparent to the CPU. (it is assumed that the scan line length is a power of 2, otherwise the addressing is more complex.)

The shift registers, such as shift register 63 of FIG. 8 are used to enable a single pixel to be clocked out from a word. Typically, more than one pixel is contained in a word therefore a parallel loaded shift register is needed to permit the individual pixels to be removed from the word. Moreover, if multi-bit pixels are used, then multi-bit shift registers are needed for each word.

ALTERNATE EMBODIMENT EMPLOYING FOUR-WAY INTERLEAVED VRAM

The results described above for a two-way interleaved system can also be obtained from a single bank of memory where four-way interleaving is used. This embodiment has the disadvantage that twice the memory capacity is required since two copies of the data are needed for the four-way interleaving, as will be described.

FIG. 11 illustrates a block diagram for the four-way interleave embodiment which again employs a dual port VRAM memory. The RAM port of the memory is connected through a latch 73 to the CPU to permit data to be read into and read from the memory. The shift register port of the memory is coupled to three latches such as latch 74 with each latch being coupled to a shift register, such as shift register 75. The multiplexer 76 selects one of the shift registers and couples its output to a CLUT 77. A digital color output from the CLUT, after convolving by convolver 78, provides RGB outputs. The latches, shift registers, multiplexer, CLUT and convolver for this embodiment operate in the same manner as the embodiment of FIG. 8 except as discussed below.

The addresses to the VRAM are selected by the multiplexer 79 either from pixel address counter 80 or from the CPU after the CPU addresses have been coupled to the parallel load counter and latch 81 (as will be described). The most significant bits of the address are coupled to the counter 81, the least significant bits are simply passed through a latch onto the multiplexer 79.

As mentioned, a single bank of VRAM is used with four-way interleaving and by storing two complete copies of the pixel data in the VRAM 72. This is necessary to obtain pixel data from three lines (sequentially) and to provide different groupings of lines as will become apparent. The four-way interleaving causes the CPU to write words into VRAM in a 4-line "zig-zag" order, however, from the CPU's standpoint this is transparent. In VRAM each of the two copies of the pixel data is stored with its interleaving offset by two lines from the other copy. That is, the word order of the first line of the even copy is: line 0/word 0, line 1/word 0, line 2/word 0, line 3/word 0, line 0/word 1, line 1/word 1, line 2/word 1, line 3/word 1, etc. And, the first line of the odd copy of the frame buffer is line-1/word 0, line-2/word 0, line 0/word 0, line 1/word 0, line-1/word 1, line-2/word 1, line 0/word 1, line 1/word 1, etc. (Lines -1 and lines -2 denote black lines above the first line on the display. They are used to avoid flicker at the perimeter of the display. They are initially loaded with data representing the color black and need not be accessed by the CPU, once loaded.)

Even though two complete copies of the pixel data are stored in the memory, the CPU only has access to the even copy. When the CPU writes data into the memory, the addresses and data are latched and the write operation is repeated to write the data into the odd copy. Moreover, only the even copy is read by the CPU. This additional writing for the odd copy is done by ordinary circuitry in the frame buffer. The even and odd copies are distinguished by the most significant bit in the VRAM, thereby placing the even frame copy in the lower half of the memory and the odd copy in the upper half.

The four-way interleaving for the even copy is obtained by taking the address bit from the CPU which select between odd and even scan lines and connecting it to bit 0 of the VRAM. The address bit from the CPU which selects between even and odd scan line pairs is connected to bit 1 of the VRAM and then all other bits from the CPU are shifted "upward" as shown in FIG. 13 in the righthand column. Again, in FIG. 13 the conventional interconnect is shown in the lefthand column for purposes of comparison as it was in FIG. 10. The effect of this bit remapping for the 1024 bytes per scan line display is that the odd and even scan line "bit" (e.g., bit 10) selects between odd and even words, and the odd and even scan line pair bit (e.g., bit 11) selects between odd and even word pairs. From the CPU's viewpoint, once again, the memory appears as a contiguous block.

The four-way interleaving for the odd frame buffer copy is obtained in the same manner as the even copy, except that before the bit remapping an adder adds the length of two scan lines to the address generated by the CPU (for example, for 1024 bytes per scan line, the number 2048 is added to the CPU address prior to the bit remapping). The effect of this addition is to offset the contents of the odd copy in the buffer by two scan lines (i.e., after remapping by 2 words). (It is assumed the scan line length is a power of 2, otherwise addressing is more complex.)

The two scan line adder is easily implemented since the only time the odd bank copy is addressed is after the even copy has been addressed. This addition is obtained from the counter 81 of FIG. 11 by incrementing the counter. Assume that there are 1024 bytes per scan line, then the CPU address bits A0-A10 are latched in the latch of counter and latch 81, and the address bits 11 and higher are coupled to the counter. To write the even copy the address bits are simply latched by the counter and latch 81. To write the odd copy, the counter is incremented and the data which has been latched is written into the memory with a two scan line offset.

Another effect of the address manipulation is to cause the output of the memory (shift register port) to be in scan lines of "line quads". The even line quads are 0/1/2/3, 4/5/6/7, 8/9/10/11, etc. The odd line quads are -2/-1/0/1, 2/3/4/5, 6/7/8/9, etc. Each convolution triplet needed by the convolver is then available in one of these line quads. The line quads are sequenced in the same order for both fields: odd line quad -2/-1/0/1, even line quad 0/1/2/3, odd line quad 2/3/4/5, even line quad 4/5/6/7, etc. The particular field displayed is determined by which three lines are convolved from each line quad. For example, in field 1 for lines -1,1,3, and 5 the triples -2/-1/0, 0/1/2, 2/3/4, and 4/5/6 are needed. Then in field 2 for lines 0, 2, 4, and 6 the triples -1/0/1, 1/2/3, 3/4/5, and 5/6/7 are needed resulting in the same line quad sequence.

The output of the memory is latched and then the shift registers are used in the manner described in conjunction with the previous embodiment, except that the line order and the line quads is different, this difference being shown in FIG. 12.

SOFTWARE EMBODIMENTS OF THE PRESENT INVENTION

The method of the present invention can be readily implemented in software to provide real time convolution. Two embodiments of the invention are described below, one, for a planar frame buffer and the other for a "chunky" frame buffer. The method for the planar frame buffer is particularly useful where a single bit per pixel (e.g., indicating black or white) is stored in the buffer.

A planar frame buffer for purposes of this application (as well as being the generally accepted definition), is one made up of bit planes, where each plane provides one bit for each pixel of the display. This arrangement is used in numerous commercially available computers such as those manufactured by Sun Microsystems, Inc., Apollo, SGI, etc. To specify a color for a given pixel, each plane contributes one bit. Thus, if there are eight planes, the maximum color depth is 8 bits per pixel; if there are 24 planes, the maximum color depth is 24 bits per pixel, etc. The CPU accesses words in a planar frame buffer only one plane at a time. For example, a 32-bit read or write from the CPU would allow access to one bit of 32 horizontally adjacent pixels at once. For the CPU to access all bits in a single pixel, it must perform as many access cycles as there are planes.

In contrast, with a chunky frame buffer, all the bits for a given pixel are stored as adjacent bits of a memory word. For example, if color depth is 4 bits per pixel, and the CPU word size is 32 bits, then 8 pixels are stored in each CPU word. Unlike the planar frame buffer, a given CPU access will always access all the bits in a given pixel, and in some cases, the bits in adjacent pixels. Chunky frame buffers are also used in commercially available computers such as Apple Computer, Inc.'s Macintosh II computer.

A. Software Embodiment of the Present Invention for a Planar Frame Buffer

Assume a one bit per pixel display is stored in the frame buffer, for example, in plane 0. Referring to FIG. 14, and ignoring for a moment, step 83, ordinary block moves are employed to move the pixel data from plane 0 to plane 1, however, when this data is moved into plane 1, it is placed one scan line down as shown by block 84. The data is again block moved from plane 0 to plane 2 of the buffer, but this time when writing into plane 2, it is written one scan line up when compared to plane 0 as indicated by step 85.

As indicated by step 86, the data from planes 0, 1 and 2 is scanned out of the memory. The block moves assure that the proper bits are available in bits 0, 1, and 2 of each pixel to immediately do a convolution as described above (typically a "1-2-1" convolution). For any given pixel, plane 0 contains the line n bit, plane 1 contains the line n-1 bit and plane 2 contains the line n+1 bit.

In the currently preferred embodiment of this method, the convolution is, in effect, precomputed for each possible 3 bit combination output from the memory and is stored in a color lookup table. This is shown by the first step 83 where the CLUT is preloaded with a gray scale data. The output of the memory during scanning is coupled to the CLUT and the output of the CLUT provides the convolved pixel data as shown at step 87.

This embodiment is again illustrated in FIG. 15 where it is assumed that the planar frame buffer has 4 planes, planes 88, 89, 90 and 91. In typical operation, the four bits defined in each pixel are provided one from each plane, as shown within the dotted line 92. Also, during typical color operation, the 4 bit output from the buffer is coupled to the color lookup table 93 to, for example, provide a 12 bit RGB output.

When the method of the present invention is implemented, a one bit per pixel display is stored in plane 0. At system startup the eight entries of the CLUT (since there are three bits per pixel, there are 8 entries) loaded to the table of gray scales (see FIG. 21). Then, the CPU repeatedly does block moves of the entirety of plane 0 to plane 1, however, one scan line down. The data from block 0 is also moved to block 2, this time, one scan line up. Once this is done, the data from the planes 88, 89 and 90 is coupled to the color lookup table to provide the gray scale output. (The data, if any, from plane 3 is ignored for this mode.)

Steps are taken to prevent flickering at the edge of the screen or display, that is, to prevent abrupt transitions at the top and bottom. It is generally best to have the border of the display smoothly convolve into black at the top and bottom. This is achieved by allocating one line initialized to black at the top and bottom of plane 0, two lines at the top of plane 1 and two lines at the bottom of plane 2. These "guardbands" assure that the top and bottom borders are smoothly convolved to black.

In the currently preferred embodiment, gamma correction is used as shown by block 13 of FIG. 1. The gamma correction can be built into the gray scale data and hence, loaded into the CLUT on initialization.

In a typical application, the CPU may not be fast enough to complete the block moves to planes 1 and 2 in a single frame time. It has been found that it is visually acceptable to complete the block moves in several frame times since plane 0 is always up-to-date and it contributes one-half of the intensity for a given pixel value.

B. Software Embodiment for the Chunky Frame Buffer

In this embodiment, a one bit per pixel real-time convolution with a chunky frame buffer is realized. Unlike the method described above for the planar frame buffer, the exact number of bits per pixel cannot be obtained when rearranging the data, hence, the next power of 2 greater than the number of bits needed is used. For the described embodiment, three-lines are used for the convolution and hence, four bits of pixel are stored in a buffer for each pixel. The method described below places the bits in their proper position.

First, it should be noted that a one bit per pixel frame buffer "off screen" in RAM is used by the CPU for drawing. This frame buffer is separate from the four bit per pixel frame buffer that is actually scanned to provide the display. The method described below reads data from the one bit per pixel frame buffer, expands the data to the four bits per pixel, then writes the data into the four bit per pixel frame buffer. The method merges the pixel information from the two previous lines before it writes the results into the four bit per pixel frame buffer. When the four bit pixel is presented to the color lookup table, the three bits for lines n−1, n and n+1 are available to lookup the proper gray scale for the 1-2-1 convolution. Again, as with the previous embodiment, the color lookup table is loaded with gray scale information to provide the convolution. (Three of the four bits read from the four bit per pixel frame buffer are used by the CLUT to provide the output convolved signal for the display.)

STEP 0

Four 32-bit words (A, B, C, and D) are initialized to zero. (A, B, C, and D each refer to 32-bit registers within the CPU.) A 32-bit word R is read starting from the leftmost pixel position of the top scan line of the one bit per pixel frame buffer. A, B, C and D are all stored at adjacent left to right locations starting from the top scan line of the four bit per pixel frame buffer.

STEP 1

R is read from the next 32 bits in the one bit per pixel frame buffer immediately below the last 32-bit word read from the one bit per pixel frame buffer. This is shown in FIG. 16 where two words, words 93 and 94, are shown for lines n and n+1 in the one bit per pixel frame buffer.

STEP 2

As shown in FIG. 17, one byte of R is expanded into a second 32-bit word M such that each of the 8 bits is placed at 4 bit intervals in the 32-bit word starting at bit 1 (i.e., bit 0 to bit1, bit 1 to bit 5, bit 2 to bit 9, etc.) and a 1 is placed in every 4th bit starting at bit 0. All other bits are set to zero. For example, the byte 0111 0101 is converted to (shown as groups of 4): 0001 0011 0011 0011 0001 0011 0001 0011. This is done by using a 256×32-bit pre-loaded lookup table in RAM.

STEP 3

A is left-shifted by 1. In some microprocessors such as the Motorola Part No. 68020 this can be accomplished more quickly by adding A to itself. In the upper part of FIG. 18, A is shown before the shift and in the lower part of FIG. 18 after the shift.

STEP 4

M is bit-wise ORed into A as shown in FIG. 19. First, this serves to merge the byte from R into A since it is known that the bits in A corresponding to the bits from the byte from R are all zero (anything ORed with zero retains its value). Second, this serves to force every 4th bit starting with bit 0 in A to one (this sets up for the merge operation in step 10, below).

STEP 5

A is stored in the four bit per pixel frame buffer immediately below the last place A was stored as shown in FIG. 20.

STEP 6

Steps 2 through 4 are repeated for the three other bytes from R. This time, however, B, C, and D are used instead of A.

STEP 7

R is read for the next 32-bit word in the one bit per pixel frame buffer immediately below the last 32-bit word as in Step 1 above.

STEP 8

As shown in FIG. 17, one byte of R is expanded into M with each of the eight bits placed at 4 bit intervals starting at bit 1. Also, a 0 is placed in every 4th bit starting at bit 0 and all other bits are set to 1. For example, the byte 0111 0101 would be converted to 1100 1110 1110 1110 1100 1110 1100 1110. This is accomplished by means of a second 256×32-bit pre-loaded lookup table in RAM.

STEP 9

As shown in FIG. 18, A is left-shifted by 1. Once again, as mentioned for step 3, addition of A to itself may be used.

STEP 10

As shown in FIG. 19, M is bit-wise ANDed into A. First, this serves to merge the byte from R into A since it is known that the bits in A corresponding to the bits from the byte from R are all ones (anything ANDed with one retains its value). Second, this serves to force every 4th bit starting with bit 0 in A to zero (this will set up the merge operation in step 4, above).

STEP 11

A is stored in the 4-bit frame buffer immediately below the last place A was stored. See word 95 of FIG. 20.

STEP 12

Steps 8 through 10 are repeated for the 3 other bytes from R. They are merged in B, C, and D instead of A. See words 96, 97 and 98 of FIG. 20.

STEP 13

Steps 1 through 12 are repeated until the bottom of the frame buffer is reached, then R is read for the pixels on the top scan line of the 1 bit/pixel frame buffer just to the right of where it was loaded at the start of the last pass. A, B, C, and D are all stored at adjacent left-to-right locations on the top scan line of the 4 bit/pixel frame buffer just to the right of where they were loaded at the start of the last pass.

In summary, the pixels in the 4-bit per pixel frame buffer 100 of FIG. 20 are coded with line n+1 in bit 1, n in bit 2, and n−1 in bit 3 (this resulting bit configuration is shown in FIG. 19). Bit 0 is ignored by the CLUT 101 of FIG. 20. The one bit per pixel frame buffer of FIG. 16 is scanned vertically with a new bit added into each four bit pixel for each scan line by left shifting the existing bit for the pixel by one and merging the new bit into bit 1 of the 4-bit per pixel word. The shift operation serves to adjust the pixel from its previous centering on line n−1 (the line above) to its current centering on line n. In other words, when the operation begins the four bit pixel data contains bits from lines n−2, n−1 and n since the data was used for the line above. The left shift operation changes the configuration of the four bits to n−1, n, and a one or a zero in bit 1 (bit 0 is ignored). Then, the new bit from the one bit per pixel frame buffer is merged into bit one for line n+1. The new assembled four bit word is stored in the four bit per pixel frame buffer and as mentioned, the CLUT is used to provide the convolution.

In detail, the method starts in the upper-left of the frame buffer and works down a 32-pixel column. The read into R loads the 32 1 bit pixels then each 8 pixels of the 32 are operated upon separately. The first 8 pixels (a byte) are used as a lookup table index to fetch a 32-bit word, M. M holds the 8 pixels, spread out at 4-bit intervals so that they are ready to merge for the 4 bit/pixel frame buffer.

M also is set up with the rest of its bits prepared for either a bit-wise AND merge or an OR merge. The reason it alternates between AND and OR is that it saves the step of clearing (or setting) the bits in A which are the destination for the 8 pixels from R. Since A will be left-shifted just prior to the AND or OR merge, the bit immediately to the right of the destination of the R bits is forced so that at the next step they are already prepared for merging. AND prepares for the OR by forcing zeroes, and OR prepares for the AND by forcing ones.

A is left-shifted by one to update the pixel from being centered for the previous line to being centered for the current line. The left-shift moves the previous line n+1 to the current line n and the previous line n to the current line n−1. Previous line n−1 (current line n−2) is shifted out. Notice that this shift applies to all eight pixels contained in the 32 bits of A so it is an 8-way parallel operation. Notice also the bits from previous line n−1 shifts into the unused bit of the next 4-bit pixel to the left (or off the left edge of the 32-bit word).

Then, M is merged with A by either an AND or an OR. Bits from n and n−1 are left alone, new n+1 bits are merged in, and the unused bits are set to known state (0 if an AND, 1 if an OR). A is finally stored in the 4 bit/pixel frame buffer.

The other 24 pixels in R are handled the same way, with 8 pixels each for B, C, and D.

The same steps are performed for each successive scan line below until the bottom of the frame buffer is reached. Then, the next column of 32 pixels immediately to the right is scanned-down, and so on until the entire frame is scanned.

The CLUT 101 of FIG. 10 is loaded in a similar manner to that of the planar frame buffer implementation above shown in FIG. 21. The differences are that the bit ordering is different and that since bit 0 in the 4-bit pixels is indeterminate (it alternates depending on whether the last merge was with an AND or an OR), the same gray value for every two CLUT entries is stored.

OTHER CONVOLUTION KERNELS

In the previous section, most of the emphasis has been on the 1-2-1 kernel. Experiments have shown that neither a 3-line convolution nor on-off-on-off reduction of 50% gray is essential in all situations for effective interlace flicker reduction. If the constraint that on-off-on-off horizontal line patterns are reduced to a 50% gray is maintained and other kernel sizes are tried other than 1×3, for each kernel size there is one set of coefficients to meet the on-off-on-off constraint. These coefficients match Pascal's traingle (i.e., 1; 1, 1; 1, 2, 1; 1, 3, 3, 1; 1, 4, 6, 4, 1; etc.).

ADAPTIVE CONVOLUTION

As mentioned above, the worst flicker patterns are the ones which have high horizontal coherence (i.e., repeat horizontally). Horizontal solid lines, horizontal dashed lines, and gray dither patterns are examples of patterns with high horizontal coherence. Text is an example of patterns without such coherence. The convolution discussed above may be adaptive, that is, it may be varied depending on the type of patterns being displayed. First, it is determined whether a repeating pattern is occurring in a local horizontal group of kernels, for example, 8 pixels across. If there is a pattern in the kernels, then all of the kernels are convolved, for example, with the 1-2-1 coefficients. If there is no such pattern, then the 8 pixels are convolved with coefficients making a sharper filter (e.g., 1-3-1 or 1-4-1). The test to determine whether a pattern is repeating must be applied continuously in a moving horizontal window, kernel by kernel. Since the test windows overlap, some kernels may be part of a pattern in one test window but not in another. For these kernels, the 1-2-1 convolution is used, since they are at the edge of the pattern. Different tests may be used for determining whether a pattern is being repeated, for example, the left four kernels may be compared with the right four kernels within the window.

We claim:

1. In a raster-scanned video display for a computer where data for the display is stored in a frame buffer, and where the data is organized in the frame buffer by scan lines with data being stored for each pixel along each scan line, an improved method for generating filtered pixel data for a first display line, comprising:
   (a) storing the pixel data in a frame buffer having a first and a second bank of video RAMs with pixel data for scan lines 2, 3, 6, 7, 10, 11 . . . being stored in said first bank and pixel data for scan lines 0, 1, 4, 5, 8, 9 . . . being stored in said second bank;
   (b) reading from said buffer the pixel data for a first pixel of the n, n+1, n+2 . . . n+N scan lines before reading from said buffer the pixel data for subsequent pixels of said n, n+1, n+2 . . . n+N scan lines;
   (c) convolving the pixel data for said first pixel of said n, n+1, n+2 . . . n+N scan lines to provide said filtered pixel data for said first pixel of said first display line;
   (d) repeating steps (b) and (c) for each subsequent pixel on said first display line.

2. The method defined by claim 1 wherein N=2.

3. The method defined by claim 2 wherein said reading step comprises the reading from said first bank the pixel data for said first pixel for said n and n+1 scan lines, and the reading from said second bank the pixel data for said n+2 and n+3 scan lines, before reading from said frame buffer the pixel data for subsequent pixels of said n, n+1, n+2 . . . n+N scan lines.

4. The method defined by claims 1 or 3 wherein said convolving step comprises performing the following computation:

$$\frac{aP_1 + bP_2 + aP_3}{2a + b}$$

where $P_1$ is the pixel data for said first pixel of said nth scan line, $P_2$ the pixel data for said first pixel of said n+1 line, and $P_3$ the pixel data for said pixel of said n+2 scan line; a and b are constants.

5. The method defined by claim 4 wherein b is equal to 2a.

6. The method defined by claim 1 wherein steps (b) through (d) are repeated for each display line in said display.

7. The method defined by claim 1 wherein pixel data is stored for 2 scan lines prior to the first displayed scan line in the frame buffer.

8. The method defined by claim 7 wherein said pixel data stored for said 2 scan lines prior to first displayed scan line represent all black, thereby providing a smoother transition at the top of said display.

9. In a raster-scanned video display for a computer where data for the display is stored in a frame buffer, and where the data is organized in the frame buffer by scan lines with data being stored for each pixel along each scan line, and additionally where each of the scan lines comprises adjacent groups of pixel data, an improved method for generating filtered pixel data for a display line, comprising:
   (a) storing the pixel data in a frame buffer having a first and a second bank of video RAMs with pixel data for scan lines 2, 3, 6, 7, 10, 11 . . . being stored in said first bank and pixel data for scan lines 0, 1, 4, 5, 8, 9 . . . being stored in said second bank;
   (b) reading from said buffer the pixel data for a first group for the n, n+1, n+2 . . . n+N scan lines before reading from said buffer the pixel data in the next group of pixels along said n, n+1, n+2 . . . n+N scan lines;
   (c) convolving the pixel data for the pixel in said first group to provide said filtered pixel data;
   (d) repeating steps (b) and (c) for the remaining groups of pixel data along said display line.

10. The method defined by claim 9 wherein said convolving step comprises performing the following computation:

$$\frac{aP_1 + bP_2 + aP_3}{2a + b}$$

where $P_1$ is the pixel data for a first pixel of said first group for the nth scan lines, $P_2$ the pixel data for said first pixel of said first group for said n+1 scan line, and $P_3$ the pixel data for the first pixel of said first group for the n+2 scan line; a and b are constants.

11. The method defined by claim 10 wherein b is equal to 2a.

12. In an apparatus for generating a raster scanned display from pixel data stored in a buffer and organized by scan lines with pixel data being stored for pixels along each scan line, an improvement for providing vertically filtered pixel data comprising:
   said buffer having a first and a second bank of video RAMs with pixel data for scan lines 2, 3, 6, 7, 10, 11 . . . being stored in said first bank and pixel data for scan lines 0, 1, 4, 5, 8, 9 . . . being stored in said second bank;
   address generation means coupled to said buffer for generating address for said buffer such that the pixel data for a first pixel on the n, n+1, n+2 . . . n+N scan lines is addressed and read from said buffer, before all the pixel data for the pixels along the n, n+1, n+2 . . . n+N scan lines is read from said buffer;
   convolving means for convolving the pixel data for said first pixel of said n, n+1, n+2 . . . n+N scan lines to provide vertically filtered data for said first pixel said convolving means coupled to said buffer.

13. The improvement defined by claim 12 wherein said convolving means comprises an adder; a multiplexer coupled to a first input terminal of said adder; a prescaler for prescaling an input to said adder, said prescaler coupled to a second input terminal of said adder; the output of said adder being coupled to a latch the output of said latch being coupled to said multiplexer and to a normalizer for normalizing the output of said latch.

14. In a raster-scanned video graphics apparatus having a buffer where pixel data is organized in planes such that the pixel data for a given pixel is stored with each of its bits in a different one of the planes, a method for providing filtered pixel data for a display stored in a first one of said planes, comprising the steps of:
   reproducing the pixel data for the n, n+1, n+2 . . . n−1, n+N lines of said first plane, as the n+1, n+2, n+3 . . . n+N+1 lines, respectively of a second plane;

reproducing the pixel data for the n, n+1, n+2 . . . n+N lines of said first plane, as the n−1, n+2, n+1 . . . n+N−1 lines, respectively of a third plane;

scanning the pixel data from said first, second and third planes, convolving the pixel data as it is read from said buffer.

15. In a raster-scanned video graphics apparatus having a buffer where pixel data is organized in planes such that the pixel data for a given pixel is stored with each bit in a different one of said planes, a method for providing filtered pixel data for a display line stored in a first one of said planes, comprising the steps of:

reproducing the pixel data in said first plane and storing it in a second plane with each scan line of pixel data being shifted in a first vertical direction;

reproducing the pixel data in said first plane and storing it in a third plane with each scan line of pixel data being shifted in a second vertical direction, opposite to said first direction;

scanning the pixel data from said first, second and third planes such that the pixel data for lines n−1, n and n+1 are read at the same time;

convolving said pixel data as it is read from said buffer.

16. The method defined by claim 15 wherein said convolving step comprises the step of preloading a table with gray scale data.

17. In a raster-scanned video apparatus having a memory where pixel data for each scan line is stored in adjacent locations in said memory, such that each word accessed from said memory includes the data for at least one pixel, a method for providing filtered pixel data for a display, comprising the steps of:

(a) reading said pixel data from said memory and writing it into a second memory such that the pixel data for a first pixel of n, n+1, n+2 . . . n+N scan lines are located in adjacent locations in said second memory;

(b) repeating step (a) for each pixel along the n, n+1, n+2 . . . n+N scan lines such that pixel data for the n, n+1, n+2 . . . n+N lines are interleaved in said adjacent memory locations;

(c) reading from said second memory said pixel data for said first pixel of said n, n+1, n+2 . . . n+N scan lines;

(d) convolving said pixel data to provide said filtered pixel data;

(e) repeating steps (c) and (d) for each pixel along the scan lines.

18. In a raster-scanned video display for a computer where data for the display is stored in a frame buffer, and where the data is organized in the frame buffer by scan lines with data being stored for each pixel along each scan line, an improved method for generating filtered pixel data for a first display line, comprising:

(a) storing first a first copy and a second copy of the pixel data in the frame buffer, said buffer comprising a plurality of video RAMs;

(b) reading from said first copy the video data for a first pixel of each scan line in the following scan line order so as to provide four-way interleaved groups; 0, 1, 2, 3; 4, 5, 6, 7; 8, 9, 10, 11; . . . , and reading from said second copy the video data for a first pixel of each scan line in the following scan line order so as to provide four-way interleaved groups: 2, 3, 4, 5; 6, 7, 8, 9; 10, 11, 12, 13; . . .

(c) convolving the pixel data for said first pixels to provide the filtered pixel data for said first pixel of said first display line where either said first or fourth scan line of pixel data in each of said four-way interleaved groups is not used for said convolving;

(d) repeating steps (b) and (c) for each subsequent pixel on said first display line.

* * * * *